United States Patent [19] [11] Patent Number: 5,035,784
Anderson et al. [45] Date of Patent: Jul. 30, 1991

[54] DEGRADATION OF ORGANIC CHEMICALS WITH TITANIUM CERAMIC MEMBRANES

[75] Inventors: Marc A. Anderson; Simonetta Tunesi; Qunyin Xu, all of Madison, Wis.

[73] Assignee: Wisconsin Alumni Research Foundation, Madison, Wis.

[21] Appl. No.: 540,408

[22] Filed: Jun. 18, 1990

Related U.S. Application Data

[63] Continuation-in-part of Ser. No. 224,052, Jul. 25, 1988, abandoned, which is a continuation-in-part of Ser. No. 78,043, Jul. 27, 1987, abandoned.

[51] Int. Cl.$^5$ .......................... C07C 1/26; C10G 17/00
[52] U.S. Cl. .................. 204/158.14; 204/914; 208/262.5; 210/748; 210/909; 585/469
[58] Field of Search .......................... 204/158.14, 914; 208/262.5; 585/469; 210/748, 909

[56] References Cited

U.S. PATENT DOCUMENTS 4,072,596  2/1978  Moeglich .................. 204/149
4,585,533  4/1986  Habeeb ..................... 204/149
4,659,443  4/1987  Byker ....................... 204/190

OTHER PUBLICATIONS

Letter with attachments dated Oct. 16, 1987 to D. Houser Carey et al., *Bull. of Env. Cont. & Tox.*, 16:6 pp. 697–701 (1976).
Matthews, *Photo. Res.*, 20:5, pp. 569–578 (1986).

*Primary Examiner*—Curtis R. Davis
*Attorney, Agent, or Firm*—Quarles & Brady

[57] ABSTRACT

Complex organic molecules, such as polychlorinated biphenyls can be degraded on porous titanium ceramic membranes by photocatalysis under ultraviolet light.

8 Claims, 3 Drawing Sheets

DEGRADATION OF ORGANIC CHEMICALS WITH TITANIUM CERAMIC MEMBRANES

This invention was made with United States government support awarded by the National Science Foundation (NSF), Grant Number: OIR-8413387 and the Department of Energy, Grant Number: DE-AS07-86-ID12626. The United States Government has certain rights in this invention.

CROSS REFERENCE TO RELATED APPLICATION

This application is a continuation-in-part of U.S. patent application Ser. No. 07/224,052 filed July 25, 1988, now abandoned, which was a continuation-in-part of U.S. Patent Application Ser. No. 078,043 filed July 27, 1987 and now abandoned.

FIELD OF THE INVENTION

The present invention relates to the use of ceramic membranes, and, in particular, relates to the reliable and successful use of both particulate and polymeric titanium ceramic membranes and coatings to degrade persistent organic compounds.

DESCRIPTION OF THE PRIOR ART

Ceramic membranes are used currently in industry and science for a variety of processes and purposes, the most common of which is separations. While organic membranes are most often used for separation processes, ceramic membranes have had increasing popularity because of several advantages which they offer over organic membranes. Ceramic membranes have a greater chemical stability since they are resistant to organic solvents, chlorine, and extremes of pH. Ceramic membranes are also stable at very high temperatures which allows for efficient sterilization of process equipment and pharmaceutical equipment often not possible with organic membranes. Because ceramic membranes are inorganic they are generally quite stable to microbial or biological degradation which can occasionally be a problem with organic membranes. Ceramic membranes are also mechanically very stable even under high pressures. The temperature, chemical, and mechanical stability of ceramic membranes allows them to be cleaned more effectively than other less durable membrane compositions.

The mechanism of operation and types of separations which can be achieved by ceramic membranes discussed in general by Asaeda et al., *Jour. of Chem. Eng. of Japan*, 19:1, 72-77 (1986). At least one line of ceramic filters is currently on the market marketed under the trade name "Ceraflo" by the Norton Company of Worcester, Mass.

While many of these characteristics seem to favor inorganic membranes over organic membranes, the use of these membranes in widespread commercial applications has been slow because of the difficulty in producing crack-free membrane which have defined pore size and pore size distributions in desirable ranges. Some types of prior art inorganic membranes, such as the ultra-stabilized zirconia membranes made by depositing particles on a silica support are stable but have relatively large pore sizes which make them suitable only for very high molecular weight separations.

Significant effort has been extended in creating metal oxide membranes using aluminium. For example, it has been demonstrated that the use of sol-gel techniques allows the reproducible preparation of alumina ceramic membranes which may be supported or unsupported. LeEnaars et al., *Jour. of Membrane Science*, 24, 261-270 (1985). By controlling various parameters of the process, it was demonstrated that reliable procedures can be developed for creating alumina ceramic membranes having relatively fine pores and a reliable size distribution of the pores.

The teachings in the art to date about the preparation of titania ceramic membranes have been limited. Most of the sol-gel teachings utilizing titanium have been aimed at preparing very thin particulate films because of their optical and corrosion resistance properties. However, the various parameters necessary for the reproducible and consistent preparation of these or similar films has not previously been rigorously described in such a fashion that they are readily replicable.

It has been recognized for some time that many toxic organic chemicals can be degraded on suspended hydrous oxide particles. Prior research has tended to focus on easy to degrade compounds, such as acetate, and on the use of suspended particles to degrade such compounds. There are, for example, teachings in the prior art of the use of suspensions of titanium dioxide particles for the degradation of complex organic molecules. The use of suspended particles for these processes is a serious limitation, however since solid substrates are clearly more convenient to utilize. However, completely solid substrates do not provide enough surface area for effective catalyzation in reasonable time periods.

SUMMARY OF THE INVENTION

The present invention is summarized in that a process for degrading complex organic molecules includes the steps of: positioning a porous titanium ceramic membrane in a liquid solution or gaseous mixture containing the complex organic molecules and irradiating the membrane in the solution with ultraviolet light.

It is an object of the present invention to provide a simple and efficient method of degrading complex organic substances.

Other objects, advantages, and features of the present invention will become apparent from the following specification.

DETAILED DESCRIPTION OF THE INVENTION

Figure 1:
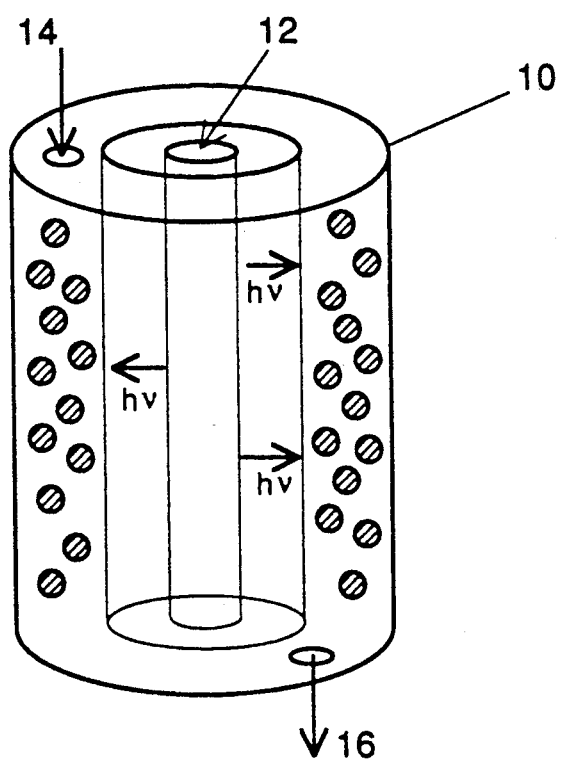

The present invention is directed to the use of membranes of titanium oxides for degradation of organic molecules. There are two variations in methods of preparing titanium membranes. The first variation involves the gellation of a colloidal sol. This first variation utilizes a type of gel that is generally particulate but which can be formed in a coherent bulk if the processing variables are controlled carefully and can result in a consistent and uniform membrane after gellation. The second variation in this method involves the hydrolysis of an organometallic titanium compound to form a soluble intermediate compound which then condenses into the organic titanium polymer. Since for catalysis, it is desired that surface area available to the substrate be maximized, a porous or particulate titanium membrane is preferred for the process of the present invention.

The process thus includes the preparation of a particulate gel which is then fired to achieve a ceramic material. In this process, there are four distinct variables which must be carefully controlled. The first is the ratio of water to titanium in the colloidal sol so that the gel is properly formed. The ratio is preferably less than about 300:1 mole-to-mole of water to titanium atoms, the second criteria is the proper selection of an alcohol solvent. The alcohol solvent is preferably an alkyl alcohol different from the alkyl radical in the titanium alkoxide used as the starting material. The third consideration is tight pH control of the colloidal mixture. This control on pH limits availability of free protons relative to titanium molecules. The fourth consideration is an upper limit upon the sintering temperatures to which the resultant gels are exposed during firing. Firing temperatures in excess of about 500° C. may introduce an unacceptable amount of cracking into the resulting ceramic.

The preparation of a particulate titanium membrane begins with a titanium alkoxide. The titanium alkoxide is first hydrolyzed at room temperature. The typical reaction is thus:

$TiR_4 + 4H_2O \Delta Ti(OH)_4 + 4R$

The R radical may be any alkyl, but titanium tetraisopropoxide $Ti(iso\text{-}OC_3H_7)_4$, has been found to be a convenient starting material.

The titanium alkoxide is first dissolved in an organic alcohol. It has been found that the hydrolysis is best facilitated by the use of an alkyl alco solvent where the alkyl is different from the alkyl in the titanium alkoxide, for example ethanol with titanium tetraisopropoxide. Water is then added in increments in a total volume of 200–300 times, mole-to-mole, of titanium present. The resulting titanium hydroxide, $Ti(OH)_4$ will precipitate out of solution.

The titanium hydroxide precipitant is then peptized with $HNO_3$, again at room temperature. This step converts the precipitant into a highly dispersed, stable, colloidal solution, or sol. This suspension is maintained by stirring is maintained dispersed over a time period of about 12 hours with moderate heating (85–95° C.) to assist the colloidal formation. When cooled to room temperature, the colloid gels. The gel may be solidified onto a support, such as glass or optical fiber, or may be deposited in molds or layered into sheets to make self-supporting structures. The gel is then sintered at a firing temperature of no more than about 500° C. to give a hard dry ceramic. Higher firing temperatures may result in cracking of the membrane. The result will be a highly porous, continuous web of sintered particles forming a rigid membrane.

The resulting titanium ceramic membrane functions as a highly desirable substrate for the photo-catalyzed degradation of organic molecules. The surface of the membranes are highly porous, thereby readily absorbing organic molecules. The titanium molecules are readily available for catalytic activity. The catalysis is actuated by UV light and broad spectrum UV radiation, even sunlight, is usable, although intense artificial UV light may tend to enhance the speed of the degradation.

Thus the titanium ceramic membrane can be used in either a supported or unsupported form for the photocatalysis. The particular formulation and configuration of the membrane and any support will depend on the particular application. For degradation in a readily illuminated fluid, such as a clear aqueous or gaseous solution, simple transparent titanium membrane may be conveniently used on a glass support. For some applications it may be desired for the waste stream to pass through the membrane to ensure contact with the membrane, in which instance either an unsupported membrane or a membrane supported on a porous support would be desired. For applications in which light may be limited, as for instance in the in situ treatment of natural bodies of water, a particularly desirable configuration would be to coat the titanium ceramic membrane directly onto a carrier of input light energy. One convenient way this could be accomplished would be to coat the membrane on the exterior of optical fibers which are carrying light energy of the appropriate wavelength, so that the membranes are intrinsically and constantly bathed in the necessary light for the catalysis.

The use of such ceramic porous membranes for photocataylic applications offers a distinct advantage over prior art systems in which films of metal oxide materials, such as anatase titanium compounds, are coated onto support surfaces. Since the surface of these metal oxide membranes are porous, the membranes give a larger effective surface area for the same physical size and weight of material, thus making potentially more of the catalyst available to the substrates. In this way, a more effective and efficient photocatalytic process can be achieved within the same size or volume of reactor or catalytic surface area. Although it was not readily predictable in advance that the metal oxide molecules in these membranes would be available for catalytic activity, it has been found that the catalytic activity does occur with the metal in such a membrane, and at a level which is higher in activity per unit of weight or gross surface area than prior art metal films.

EXAMPLE 1 a) Preparation of Particulate Membranes

Titanium tetraisopropoxide was obtained from Aldrich Chemical Company. Water used in the reactions was de-ionized using a Milli-Q water purification system from Millipore Corporation.

A series of hydrolysis and particle gel formation experiments were performed using a variety of pH levels and ratio between water concentration and titanium ion concentration. The results are summarized in Table 1 below.

TABLE 1

| No. | $H_2O/Ti$ (mole ratio) | $H^-/Ti$ (ratio) | $TiO_2$ (wt %) | Stability of Sol | Features of Solid Gel | *Weight Loss in Gellation |
|---|---|---|---|---|---|---|
| Group A | | | | | | |
| 1 | 200 | 0.08 | 2.0 | NP | good | |
| 2 | 200 | 0.2 | 2.0 | S | good | 97.66% |
| 3 | 200 | 0.4 | 2.0 | S | good | 97.62% |
| 4 | 200 | 0.7 | 2.0 | S | good | 97.61% |
| 5 | 200 | 1.0 | 2.0 | S | cracks present | 97.60% |
| 6 | 200 | 1.2 | 2.0 | NS | cracks present | |
| Group B | | | | | | |
| 1 | 300 | 0.1 | 1.3 | S | good | |
| 2 | 300 | 0.5 | 1.3 | S | good | |
| 3 | 300 | 1.0 | 1.3 | S | good | |
| 4 | 300 | 1.2 | 1.3 | S | good | |

S = Stable
NS = not stable, floccus appearance
NP = not peptized completely
*Weight loss from original sol to solid gel, given as a percentage of the original sol weight.

From the above data it is evident that the stable titanium sols can be best achieved if the mole ratio of free hydrogen ions (from the acid) to titanium molecules is between 0.1 and 1.0. This range can be expanded only in relatively dilute sol solutions such as those of Group B on the table. The reason for this is not completely understood but may relate to the increased interparticle distance in the more dilute solutions making aggregation more difficult than in concentrated sols. Only stable sols could be properly then transformed by evaporation into coherent transparent gels and thereafter into coherent oxide membranes by protolysis.

The concentration of the acid was found to effect the gelling volume. The gelling volume goes through a minimum when the acid concentration is about 0.4 moles of free protons per mole of titanium. The sols need to loose at least 4.5% of their original weight, depending upon the electrolyte concentration, to arrive at the gelling point. The sols must loose some additional 97.6% of their original weight in order to form a final solid gel. Heating the final gels in the sintering process results in a further weight loss of about 13.5% without destroying the internal gel structure.

b) Degradation of PCB on $TiO_2$ Supported Membranes

To diminish the presence of $TiO_2$ particles in solution due to edge dissolution, the glass supported membrane was previously stirred in distilled water overnight. The 3,4 dichloro biphenyl (3,4-DCB)(0.05 mg from hexane solution) was added to the membrane by letting the solvent evaporate. The membrane was then immersed in 50 ml of Milli-Q distilled water and then put in a cylindrical Pyrex container. The effect of temperature on the degradation of 3,4-DCB adsorbed on $TiO_2$ particles has already been investigated, as disclosed in S. Tunesi, M. Anderson, *Photocatalysis of 3,4-DCB in $TiO_2$ aqueous suspension; effects of temperature and light intensity; CIR-FTIR interfacial analysis*, 16 Chemosphere 7, 1447, (1987), the disclosure of which is hereby incorporated by reference. Therefore, a constant temperature of 60° C. was chosen for the experiments. The temperature was kept constant by immersing the pyrex vessel in a thermostatic water bath. Irradiation was provided with a high intensity UV light source, a Xe-Mg lamp such as an LPS 200 from Photo Technology International. A blank experiment was run in dark conditions. After 5 hours of irradiation the 3,4-DCB was Soxhlet extracted with a (100:100 ml) mixture of hexane/acetone. The particulate was extracted from 5 ml of water with hexane (5 ml×4). Gas chromatographic analysis was performed to determine the organic concentration, with a Hewlett Packard 5730 gas chromatograph, equipped with an EC detector and a capillary column. The percent degradation was calculated assuming the dark experiment as the zero degradation reference. Observed maximum degradation on the membrane was 93%, while the degradation in water, due to organic absorption on TiO particulate, was 75%. The weight recovery of the organic in the dark experiment, with respect to the amount of organic deposited on the membrane, was 37%.

c) Degradation of Salicylic Acid (SALA) and 3-Chlorosalicylic (3 ChS) on Unsupported $TiO_2$ Membranes The photocatalytic degradation of salicylic acid (SALA) was performed in a photochemical reactor which had a cylindrical configuration and in which was placed an unsupported $TiO_2$. The reactor was placed so that the fluid therein circulated around a Hanovia UV-Hg irrigating lamp. The temperature was controlled by a circulating water jacket. A dye filter, $5 \times 10^{-2}$M in $NaVO_3$ and 5% NaOH, was circulated between the UV lamp and the suspension to reduce UV transmission at 340 nm to reduce direct organic photodegradation. Previously salicylate solution had been found to exhibit 25% degradation from a starting solution of 25° microMolar, after 4 hours at a temperature of 45° C.

The photocatalysis of SALA was performed at a pH=3.7 and a temperature of 29° C. The $TiO_2$ membrane had been 700 ml of the solution which had had its pH equilibrated overnight. After adding the SALA, the suspension was equilibrated for one hour, which kinetics experiments had indicated was sufficient time to reach equilibrium. The concentration of SALA in the equilibrium solution was measured, by ultrafiltration with a Nucleopore 0.05 micron membrane, to be $88 \times 10^{-6}$ M. The solution was then irradiated for 3 hours and 40 minutes, and the concentration of SALA was remeasured and found to be $0.6 \times 10^{-6}$ M or 0.7% of the initial concentration.

A similar reaction conducted with 3 chlorosalicylate (3-Chs) in this same reactor type. At 25° C. after 3 hours the extent of degradation of 3-ChS was found to be about 90% of the initial concentration.

d) Degradation of Trichloroethylene in the Gaseous Phase

The photocatalysis of a gaseous phase organic molecule may also be carried out using such a titanium oxide porous ceramic membrane. To perform such a reaction, a light source capable of providing light in the UV range is provided inside a transparent casing such as a glass cylinder. A water jacket may be disposed around the light source for cooling of the lamp and to provide a sink for infrared radiation. The jacketed light source may then placed inside a reaction chamber which is coated on its interior surface with a titanium oxide porous ceramic membrane. Alternatively, the porous ceramic membrane may be supported on a support such a beads or other form of particulate support. Preferably the membrane is one in which the constituent particles from which the membrane is made are relatively small, but the pore size is relatively large, to permit good porosity and thus good access of the reactants to the catalytic membrane.

Shown in FIG. 1 is a diagram of the reactor actually used to degrade trichloroethylene (TCE) in the gaseous phase. The annular shell (10) of the reactor was constructed out of Pyrex for temperature stability and transparency. A central tube (12) extending centrally through the shell (10) was designed to be wide enough to hold fluorescent UV bulbs of approximately 16 inches long and 1.5 inches in diameter. The porous ceramic membrane was coated onto Pyrex beads with which the shell (10) was packed. Gas flow was from an inlet (14) to an outlet (16).

The porous ceramic membrane was prepared as in Example 1. The sol was prepared using a water-to-Ti ratio of 200 and a H+-to-Ti mole ratio of 0.4. 5 mm Pyrex beads were dipped into this sol and withdrawn slowly (<1 inch/min.). The beads were fired in air for one hour at 400° C. The coating process was then repeated for the beads a second time. These procedures have been previously found to produce a coating which is about 1 to 2 microns thick, with a surface area of about 100 m²/g at this firing temperature.

Figure 2:
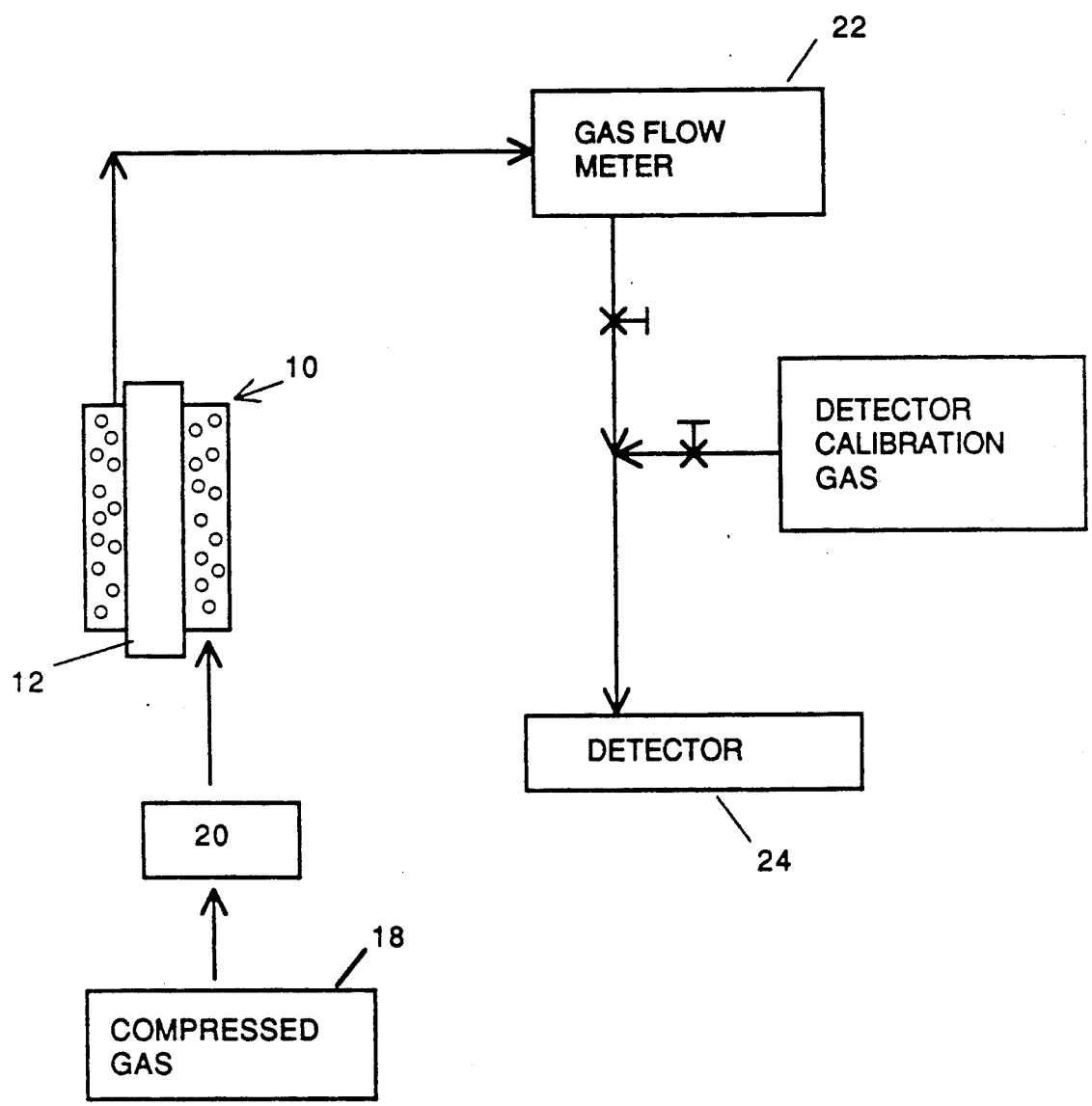

FIG. 2 is a block diagram of the flow-through system used to determine the degradation of TCE by the coated beads. Connecting lines were made of glass tubing or flexible Teflon tubing, with some short silicone tubing at the joints. Gas condensation was eliminated by wrapping a heat tape around the tubings. Temperature control was maintained by wrapping the outside of the surface of the reactor with silicone tubing and circulating water through this tubing from an outside water bath and by operating the lamp only as needed. The temperature was held within 1° C.

Two fluorescent UV bulbs were used in the reaction. The bulb BL-9 is centered in its emission at 368 nm while the BL-5 bulb emits at 330 nm.

A tank of breathing air (no $CO_2$) was used as an oxygen source (18). The gas mixing station (20) consisted of two lines with valves, one line passing directly to the photoreactor and the other line passing the compressed gas through a reservoir containing liquid trichloroethylene. Influent TCE concentrations were measured with the light source turned off, by adjusting the flow of air through the reservoir until the desired level was obtained. Effluent TCE concentrations were then measured with the light turned on.

Gas exiting from the reactor was ducted to a flow meter (22) and from their to a detector (24). The detector was a HNU Model 101 photoionization detector with a lamp operating at 10.2 eV. In this range, the detector does not register the presence of normal atmospheric gases such as $N_2$, $O_2$, $H_2O$, $CO_2$ or $CH_4$. To avoid possible detector readings caused by oxygen changes or water vapor in the system, oxygen levels were first monitored at the appropriate levels for calibration, and water vapor was removed with a magnesium perchlorate desiccant trap.

Figure 3:
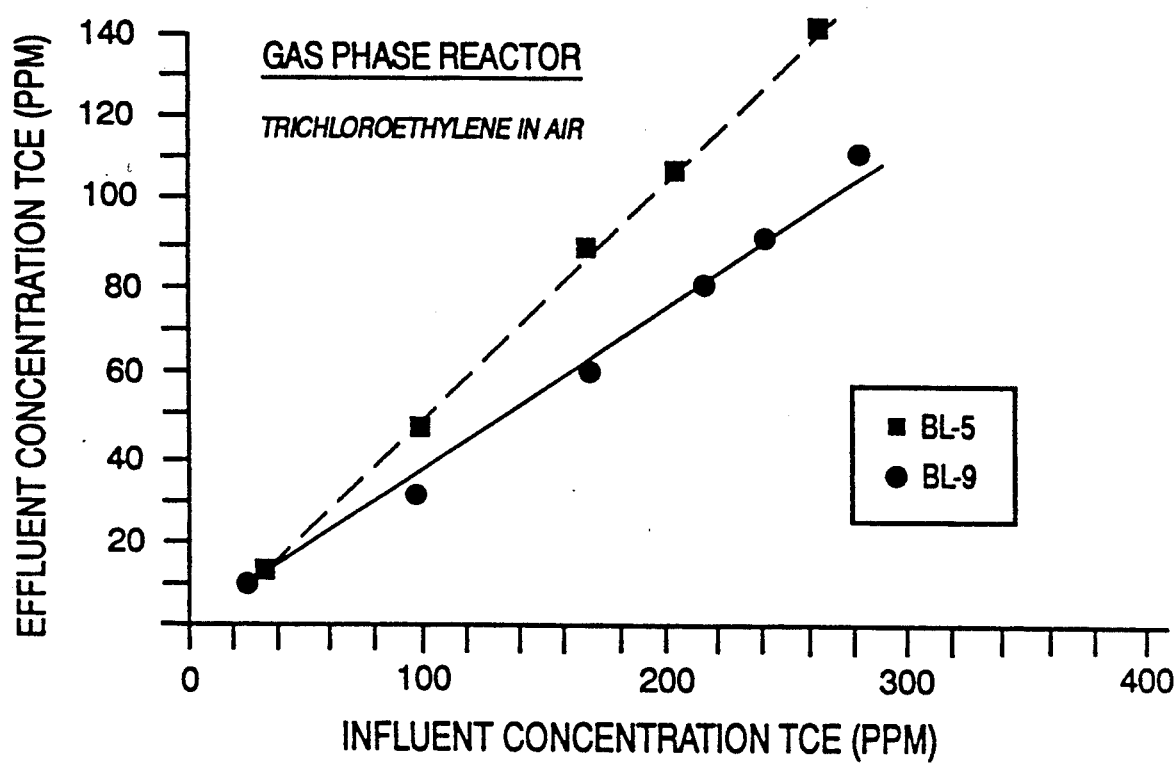

FIG. 3 illustrated the results of the procedures for differing levels of TCE input. All the experiments were conducted at 60° C. at a gas flow rate of 4.7 L/min. The 368 nm bulb seemed to cause more degradation, perhaps because of increased absorbance of 330 nm light by the titantia. While each of the data points were gathered in brief runs in which measurements were taken as soon as the system stabilized, generally in under one minute, in one replicate the apparatus was allowed to run overnight with 140 ppm TCE flowing through the reactor. The effluent levels did not change appreciably overnight. Analysis of the data revealed that in this single pass through the reactor, in excess of 60% of the influent TCE was degraded. The residence time of the gas flow in the reactor was calculated to be about 100 seconds at concentrations of TCE up to 300 ppm.

Thus this reactor, even though not optimized, was capable of degrading over one half of the influent organic effluent in a single pass. The large amount of catalytic activity achieved is due in part to the large surface area provided by the porous membrane coated onto the beads. The porous nature of the membrane allowed good contact between the substrate and the catalyst not possible with anatase slurry coatings. In fact, the results were compared with anatase slurry coated beads with the result that the porous membrane coated beads were found to result in a greater level of degradation than the anatase slurry coated beads.

It is understood that the invention is not confined to the particular materials, structures and processes set forth herein as illustrative, but embraces such modified forms thereof as come within the scope of the following claims.

What is claimed is:

1. A method of degrading complex organic molecules comprising the steps of exposing the organic molecules in solution to a ceramic porous membrane of titanium; and irradiating the titanium membrane with ultraviolet light wherein the step of exposing the complex organic molecules to the membrane includes adsorbing the molecules in the membrane.

2. A method of degrading complex organic molecules comprising the steps of exposing the complex organic molecules to a porous metal oxide ceramic membrane of a transition metal by adsorbing the molecules in the membrane and irradiating the membrane with ultraviolet light.

3. A method as claimed in claim 2 wherein the complex organic molecules are polychlorinated biphenyls.

4. A method of degrading complex organic molecules comprising the steps of adsorbing the organic molecules in the gaseous phase into a porous metal oxide ceramic membrane and irradiating the membrane with ultraviolet light.

5. A method as claimed in claim 4 wherein the metal is titanium.

6. A method of degrading complex organic molecules comprising the steps of exposing the organic molecules in the gaseous phase to a porous metal oxide ceramic membrane and irradiating the membrane with ultraviolet light wherein the membrane is coated onto the exterior of the light source.

7. A method of degrading complex organic molecules comprising the steps of exposing the organic molecules in the gaseous phase to a porous metal oxide ceramic membrane and irradiating the membrane with ultraviolet light from an optical fiber wherein the membrane is coated onto the exterior of the optical fiber carrying the ultraviolet light.

8. A method of degrading complex organic molecules comprising the steps of exposing the complex organic molecules to a porous metal oxide ceramic body of a transition metal by adsorbing the molecules in the body and irradiating the adsorbed molecules with ultraviolet light.

* * * * *

UNITED STATES PATENT AND TRADEMARK OFFICE
CERTIFICATE OF CORRECTION

PATENT NO. : 5,035,784
DATED : July 30, 1991
INVENTOR(S) : Marc A. Anderson, Simonetta Tunesi and Qunyin Xu It is certified that error appears in the above-identified patent and that said Letters Patent is hereby corrected as shown below:

Column 1, lines 5-10, should read as follows:

--This invention was made with United States Government support awarded by the Department of Energy (DOE), Grant #DE-AS07-861D12626 and AX0798826-1, the National Science Foundation (NSF), Grant #0IR-8413387, and EPA Grant #R813457-01-0. The United States government has certain rights in this invention.--.

Signed and Sealed this

Thirtieth Day of November, 1993

Attest:

BRUCE LEHMAN

Attesting Officer

Commissioner of Patents and Trademarks